United States Patent
Kang et al.

(10) Patent No.: US 11,395,298 B2
(45) Date of Patent: Jul. 19, 2022

(54) METHOD FOR ALLOCATING TRANSMISSION RESOURCE FOR DEVICE TO DEVICE DIRECT COMMUNICATION IN WIRELESS COMMUNICATION SYSTEM AND APPARATUS THEREFOR

(71) Applicant: LG Electronics Inc., Seoul (KR)

(72) Inventors: Sungyong Kang, Seoul (KR); Hanbyul Seo, Seoul (KR); Youngtae Kim, Seoul (KR); Hyukjin Chae, Seoul (KR); Heejin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 78 days.

(21) Appl. No.: 16/604,074

(22) PCT Filed: Apr. 10, 2018

(86) PCT No.: PCT/KR2018/004177
§ 371 (c)(1),
(2) Date: Oct. 9, 2019

(87) PCT Pub. No.: WO2018/190604
PCT Pub. Date: Oct. 18, 2018

(65) Prior Publication Data
US 2020/0037307 A1 Jan. 30, 2020

Related U.S. Application Data

(60) Provisional application No. 62/483,931, filed on Apr. 10, 2017.

(51) Int. Cl.
H04W 72/04 (2009.01)
H04W 4/46 (2018.01)
(Continued)

(52) U.S. Cl.
CPC ......... *H04W 72/048* (2013.01); *H04W 4/026* (2013.01); *H04W 4/027* (2013.01); *H04W 4/46* (2018.02); *H04W 72/02* (2013.01)

(58) Field of Classification Search
CPC ..... H04W 72/048; H04W 4/46; H04W 4/026; H04W 4/027; H04W 72/02
See application file for complete search history.

(56) References Cited

U.S. PATENT DOCUMENTS

2015/0156806 A1 6/2015 Pan
2015/0334760 A1 11/2015 Sartori et al.
(Continued)

FOREIGN PATENT DOCUMENTS

JP 2018513626 5/2018
WO WO2016144147 9/2016
(Continued)

OTHER PUBLICATIONS

Intel Corporation, "Partial sensing for P2V communication," R1-1611923, 3GPP TSG RAN WG1 Meeting #87, Reno, USA, dated Nov. 14-18, 2016, 5 pages.
(Continued)

*Primary Examiner* — Ricky Q Ngo
*Assistant Examiner* — Stephen N Steiner
(74) *Attorney, Agent, or Firm* — Fish & Richardson P.C.

(57) ABSTRACT

The present application provides a method for transmitting a signal by an in-vehicle terminal, using device to device direct communication, in a wireless communication system. Specifically, the method comprises the steps of: configuring a restricted resource set on the basis of sensing of a transmission resource pool; determining a reserved resource set within the restricted resource set; and transmitting the signal at a first time point by using a transmission resource selected from an available resource set except for the restricted
(Continued)

resource set in the transmission resource pool, wherein the reserved resource set is configured as the available resource set at a second time point.

2 Claims, 10 Drawing Sheets

(51) Int. Cl.
*H04W 4/02* (2018.01)
*H04W 72/02* (2009.01)

(56) References Cited

U.S. PATENT DOCUMENTS

| | | | |
|---|---|---|---|
| 2016/0295624 A1* | 10/2016 | Novlan | H04W 72/04 |
| 2017/0086028 A1* | 3/2017 | Hwang | H04W 72/02 |
| 2017/0295579 A1* | 10/2017 | Sheng | H04W 64/00 |
| 2017/0303238 A1* | 10/2017 | Fodor | H04W 4/025 |

FOREIGN PATENT DOCUMENTS

| | | |
|---|---|---|
| WO | WO2016159712 | 10/2016 |
| WO | WO2017048100 | 3/2017 |
| WO | WO2017052426 | 3/2017 |
| WO | WO2017179286 | 10/2017 |

OTHER PUBLICATIONS

CATT, "Measurement metric for the congestion level in LTE V2X," R1-1608720, 3GPP TSG RAN WG1 Meeting #86bis, Lisbon, Portugal, dated Oct. 10-14, 2016, 6 pages.

PCT International Search Report and Written Opinion in International Application No. PCT/KR2018/004177, dated Jul. 13, 2017, 15 pages (with English translation).

CATR, "Resource allocation and selection enhancement for V2V communications," R1-163128, 3GPP TSG RAN WG1 Meeting #84bis, Busan, Korea, dated Apr. 11-15, 2016, 4 pages.

CATT, "Consideration on design for eNB scheduling PC5 V2V," R1-156608, 3GPP TSG RAN WG1 Meeting #83, Anaheim, USA, dated Nov. 15-22, 2015, 4 pages.

Extended European Search Report in European Application No. 18784061.6, dated Nov. 9, 2020, 5 pages.

Korean Notice of Allowance in Korean Application No. 10-2019-7028164, dated Oct. 22, 2020, 5 pages (with English translation).

Sony, "Location based resource selection on LTE sidelink for V2V services," R1-160678, 3GPP TSG RAN WG1 Meeting #84, St Julian's, Malta, dated Feb. 15-19, 2016, 3 pages.

ZTE, "CR for the V2X sidelink communication in 36.300," R2-1703073, 3GPP TSG RAN WG2 #97bis, Spokane, USA, dated Apr. 3-7, 2017, 10 pages.

* cited by examiner

(A) CONTROL-PLANE PROTOCOL STACK (B) USER-PLANE PROTOCOL STACK

METHOD FOR ALLOCATING TRANSMISSION RESOURCE FOR DEVICE TO DEVICE DIRECT COMMUNICATION IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/004177, filed on Apr. 10, 2018, which claims the benefit of U.S. Provisional Application No. 62/483,931, filed on Apr. 10, 2017. The disclosures of the prior applications are incorporated by reference in their entirety.

TECHNICAL FIELD

The present disclosure relates to a wireless communication system, and more particularly, to a method for allocating a transmission resource for device-to-device (D2D) communication in a wireless communication system and apparatus therefor.

BACKGROUND ART

3GPP LTE (3rd generation partnership project long term evolution hereinafter abbreviated LTE) communication system is schematically explained as an example of a wireless communication system to which the present disclosure is applicable.

Figure 1:
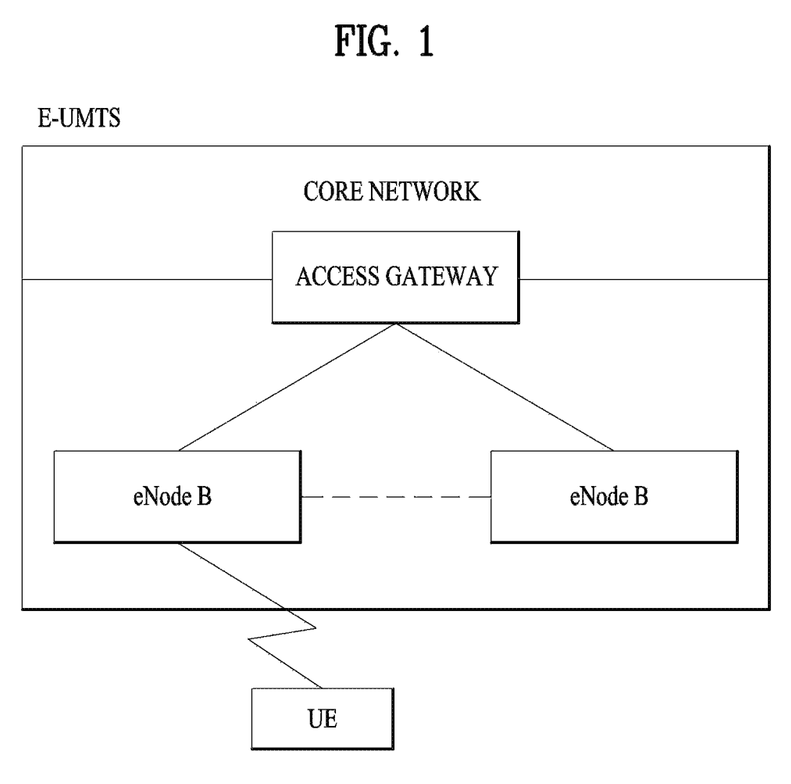
FIG. 1 illustrates a configuration of an Evolved Universal Mobile Telecommunications System (E-UMTS) network as an example of a wireless communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

Based on the above discussion, the present disclosure proposes a method for allocating a transmission resource for D2D communication in a wireless communication system and apparatus therefor.

Technical Solution

In an aspect of the present disclosure, provided herein is a method of transmitting, by a vehicle user equipment (UE), a signal using device-to-device (D2D) communication in a wireless communication system. The method may include: configuring a restricted resource set based on sensing of a transmission resource pool; determining a reserved resource set within the restricted resource set; and transmitting the signal at a first time using a transmission resource selected from an available resource set except the restricted resource set in the transmission resource pool. The reserved resource set may be set to the available resource set at a second time.

In another aspect of the present disclosure, provided herein is a UE for transmitting a signal using D2D communication in a wireless communication system. The UE may include a wireless communication unit and a processor connected to the wireless communication unit. The processor may be configured to configure a restricted resource set based on sensing of a transmission resource pool, determine a reserved resource set within the restricted resource set, and transmit the signal at a first time using a transmission resource selected from an available resource set except the restricted resource set in the transmission resource pool. In addition, the processor may be configured to set the reserved resource set to the available resource set at a second time.

Preferably, at least one resource with a sensing result more than or equal to a threshold in the transmitting resource pool may be configured as the restricted resource set, and at least one resource with a sensing result expected to be less than or equal to the threshold at a second time in the restricted resource set may be determined as the reserved resource set.

More Preferably, whether the sensing result is expected to be less than or equal to the threshold at the second time may be determined based on at least one of a moving direction of another vehicle UE, a moving speed of the other vehicle UE, or a transmission beam direction of the other vehicle UE.

Further, when there are insufficient resources in the available resource set for transmitting the signal at the first time, the transmission resource may be selected from the reserved resource set.

Advantageous Effects

According to the present disclosure, a transmission resource for D2D communication can be more efficiently allocated It will be appreciated by persons skilled in the art that that the effects that can be achieved through the present disclosure are not limited to what has been particularly described hereinabove and other advantages of the present disclosure will be more clearly understood from the following detailed description.

BEST MODE

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system. In addition, while the embodiments of the present disclosure are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 2:
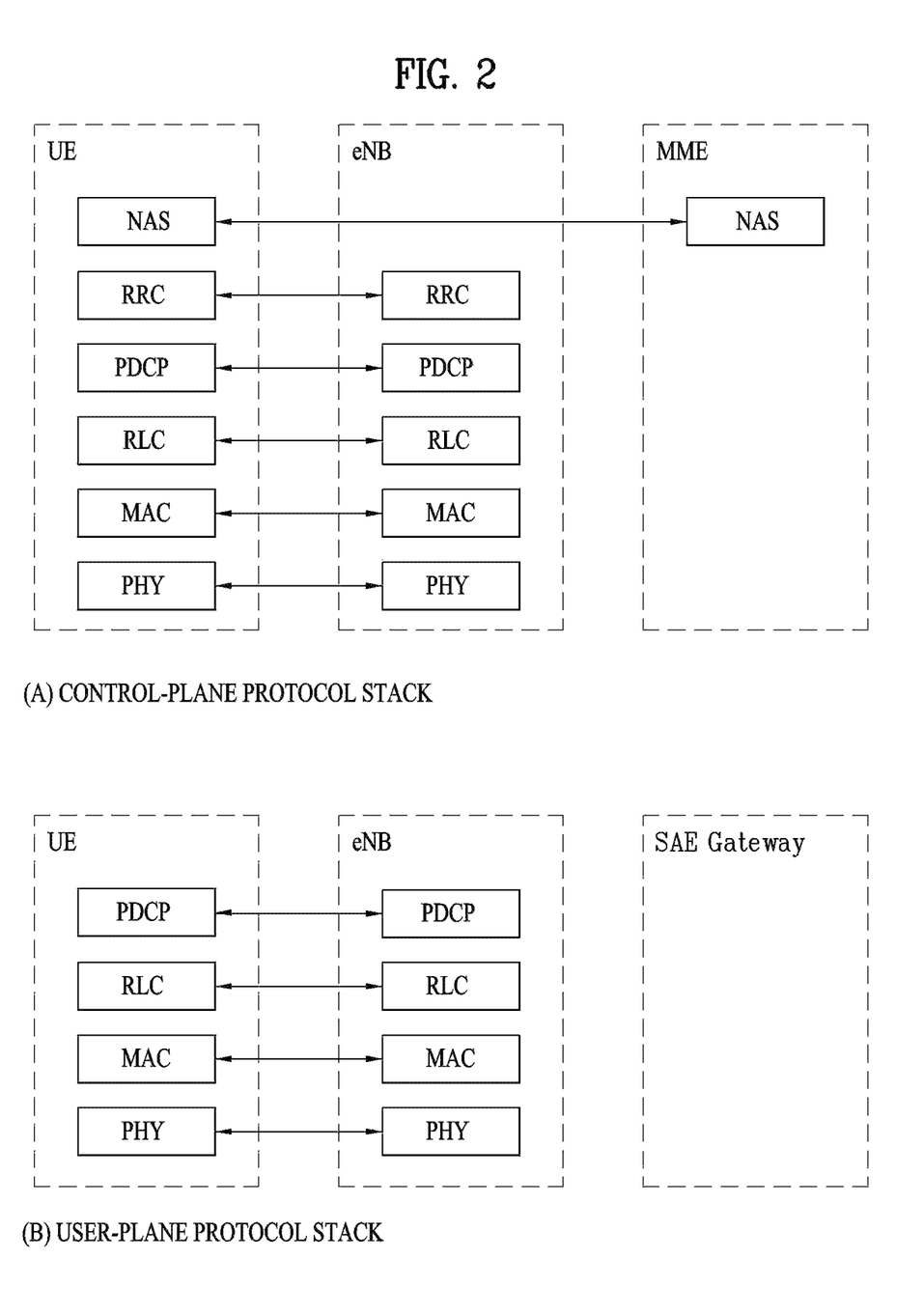
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting an eNB is configured to use one of bandwidths of 1.25, 2.5, 5, 10, 15, and 20 MHz and provides a DL or UL transmission service to multiple UEs. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
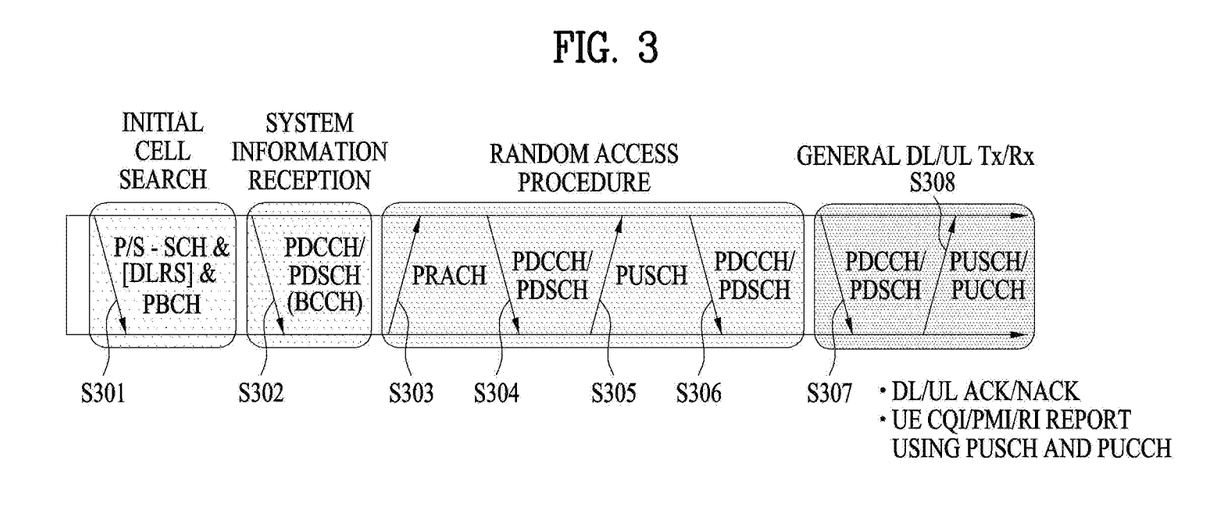
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
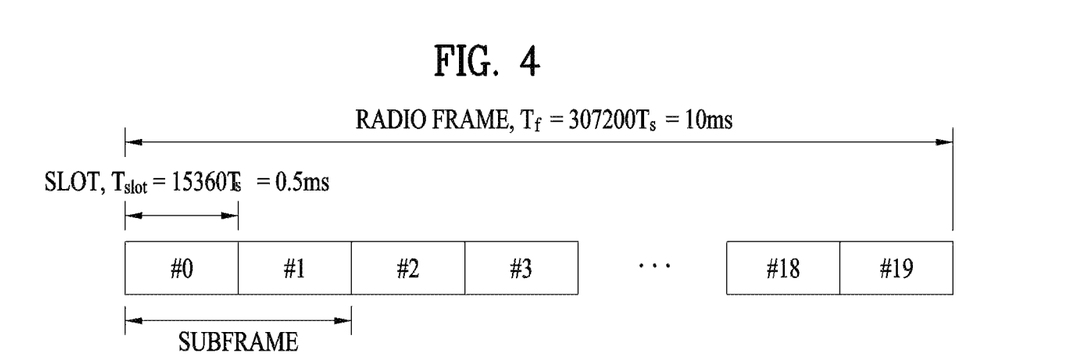
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15\ kHz\times2048)=3.2552\times10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
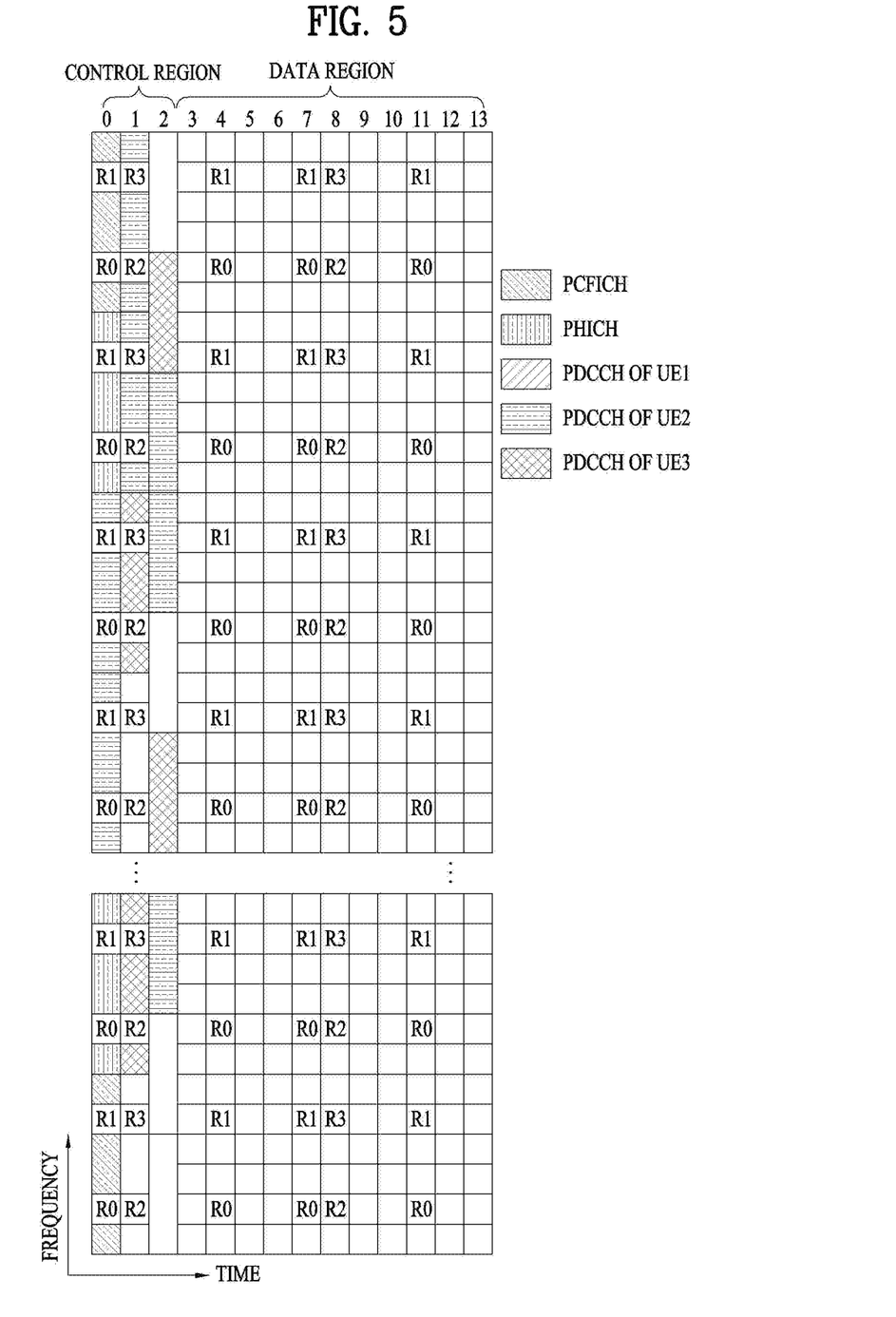
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
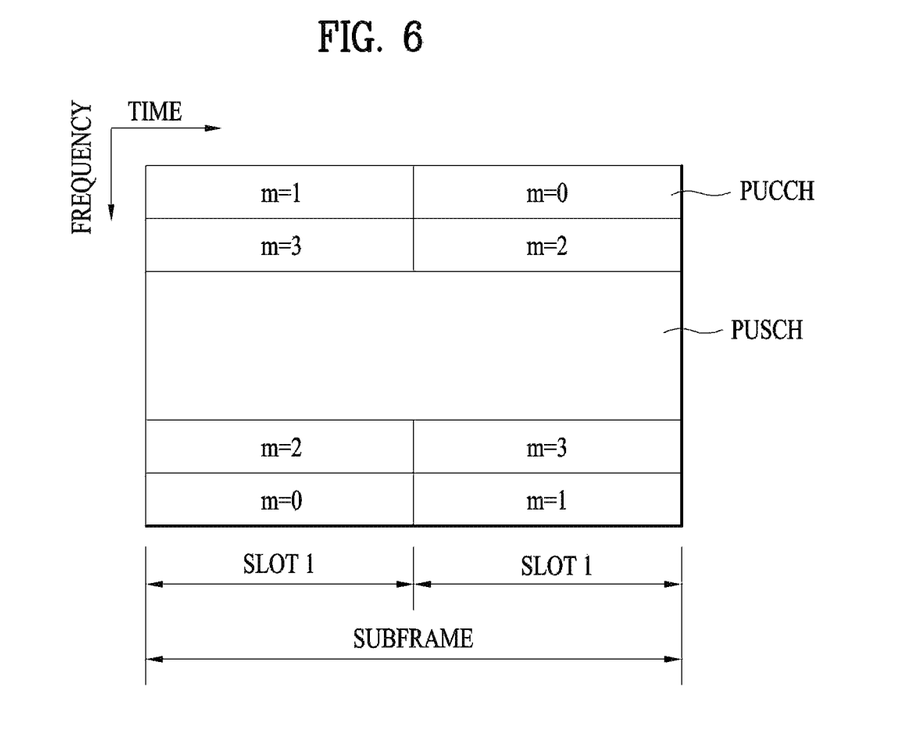
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
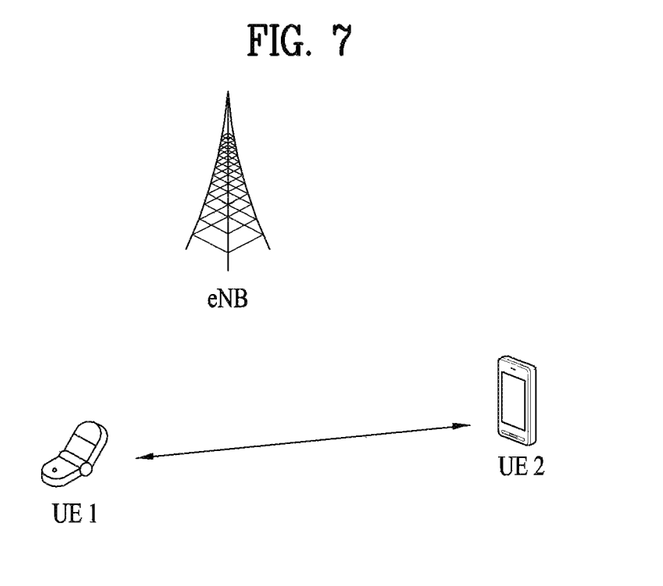
FIG. 7 is a diagram illustrating the concept of device-to-device (D2D) communication.

FIG. 7 is a diagram illustrating the concept of device-to-device (D2D) communication.

Referring to FIG. 7, during D2D communication (i.e., D2D direct communication) in which a UE wirelessly communicates with another UE, an eNB may transmit a scheduling message for indicating D2D transmission/reception. In the following description, a link established between UEs for direct communication therebetween, i.e., a D2D link is referred to as a sidelink (SL) as the concept opposite to uplink and downlink.

A UE participating in sidelink communication receives a sidelink scheduling message from an eNB and performs transmission and reception operation based on the sidelink scheduling message. Here, although a UE means a user terminal, a network entity such as an eNB may be regarded as a kind of UE if the network entity transmits/receives signals according to a communication scheme between UEs. In addition, an eNB may receive a sidelink signal transmitted from a UE, and a UE may use a signal transmission and reception method designed for sidelink communication between UEs to transmit an uplink signal to an eNB.

For sidelink communication, a UE performs a discovery process for determining whether a peer UE, which the UE desires to communicate with, is in an adjacent area where the sidelink communication is possible. The discovery process is performed as follows. First, a UE transmits a unique discovery signal that allows other UEs to identify the corresponding UE. When detecting the discovery signal, a neighboring UE recognizes that the UE transmitting the discovery signal is located in the vicinity thereof. That is, each UE checks whether a peer UE corresponding to a sidelink communication target is located in the vicinity thereof through the discovery process and then performs sidelink communication to transmit and receive user data to and from the peer UE.

Described in the following is a case for a UE1 to select a resource unit corresponding to a specific resource from a resource pool, which means a set of a series of resources, and transmit a sidelink signal using the corresponding resource unit. Here, the resource pool may be announced by a base station if the UE1 is located within the coverage of the base station. If the UE1 is located out of the coverage of the base station, the resource pool may be announced by another UE or determined as a predetermined resource. Generally, a resource pool is configured with a plurality of resource units, and each UE may select one or a plurality of resource units and then use the selected resource unit(s) for a sidelink signal transmission of its own.

Figure 8:
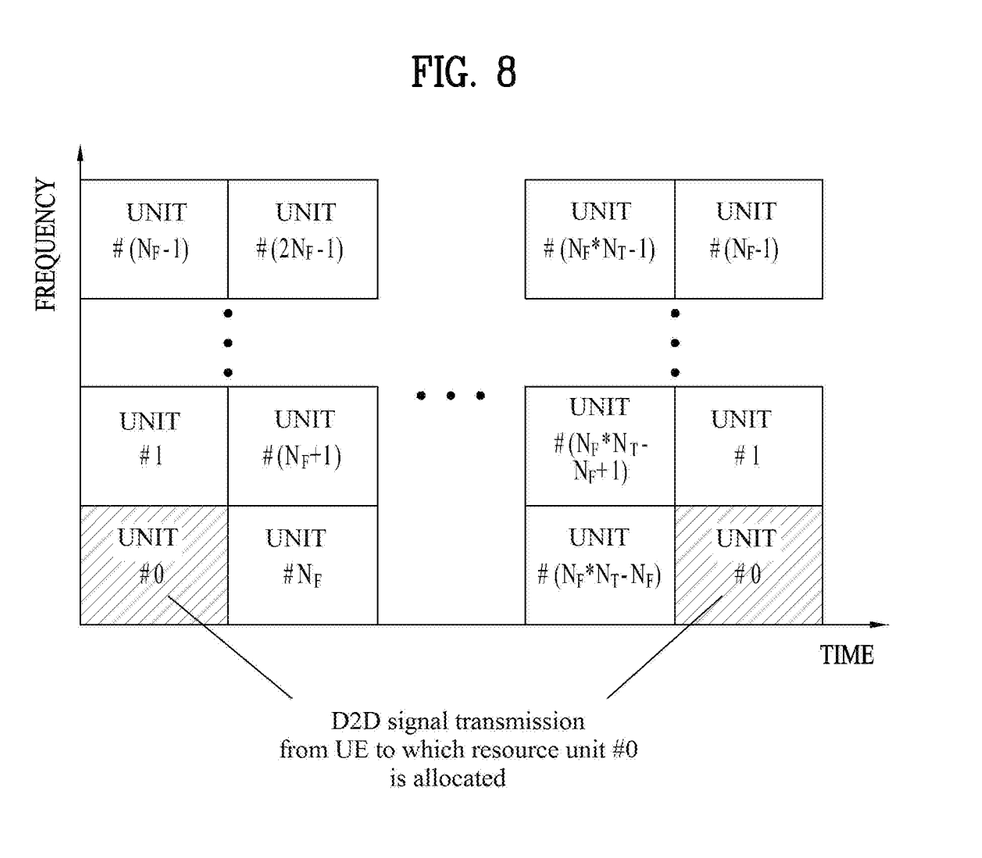
FIG. 8 illustrates an exemplary configuration of a resource pool and a resource unit.

FIG. 8 shows a configuration example of a resource pool and a resource unit.

Referring to FIG. 8, an entire frequency resource is divided into $N_F$ and an entire time resource is divided into $N_T$, whereby total $N_F*N_T$ resource units can be defined. Particularly, a corresponding resource pool may be repeated by period of $N_T$ subframes. Typically, a single resource unit may appear periodically and repeatedly. Or, in order to obtain a diversity effect in a time or frequency dimension, an index of a physical resource unit having a single logical resource unit mapped thereto may change in a previously determined pattern according to time. In such a resource unit structure, a resource pool may mean a set of resource units that can be used for a transmission by a UE intending to transmit a sidelink signal.

The above-described resource pool may be subdivided into various types. First of all, it can be classified according to a content of a sidelink signal transmitted on a resource pool. For example, like 1) to 4) in the following, a content of a sidelink signal may be classified into a sidelink data channel and a discovery signal. And, a separate resource pool may be configured according to each content.

1) Scheduling Assignment (SA): This refers to a signal including resource location information of a sidelink data channel followed by a transmitting (Tx) UE and information such as Modulation and Coding Scheme (MCS) for demodulation of a data channel, an MIMO transmission scheme and the like. The SA can be transmitted in a manner of being multiplexed with sidelink data on the same resource unit. In this case, an SA resource pool may mean a pool of resources on which SA is transmitted by being multiplexed with sidelink data.

2) Sidelink data channel: This refers to a channel used for a Tx UE to transmit user data. If SA is transmitted by being multiplexed with sidelink data on a same resource unit, a Resource Element (RE) used in transmitting SA information on a specific resource unit of an SA resource pool may be used to transmit sidelink data on a sidelink data channel resource pool.

3) Discovery signal: This means a resource pool for a signal enabling a neighboring UE to discover a Tx UE in a manner that the Tx UE transmits information such as its own ID and the like.

4) Synchronization signal/channel: This may be referred to as a sidelink synchronization signal or a sidelink broadcast channel, and mean a resource pool for a signal/channel for a receiving (Rx) UE to achieve a goal of matching time/frequency synchronization with a Tx UE in a manner that the Tx UE transmits a synchronization signal and information relevant to synchronization.

Hereinafter, a description will be given of a method of allowing a device (i.e., UE) that selects a time/frequency resource for data transmission to recognize a restricted resource as an available resource during resource selection if a predetermined condition is satisfied.

For example, when a Mode-4 UE performing vehicle-to-everything (V2X) communication without instructions from an eNB selects transmission resources based on sensing, the Mode-4 UE may restrict itself not to select resources occupied by other UEs by excluding the resources from candidate resources. To this end, the present disclosure proposes a method of recognizing a restricted resource as an available resource under the predetermined condition. In other words, when a UE operating in mode 4 performs resource selection for its data transmission, if the predetermined condition is satisfied, the UE may use resources occupied by another UE based on information on the location, location after a certain amount of time, speed, accelerated speed, beam direction, occupied resources, etc. of the UE or the other UE, which is grasped from sensing, sensor data, (transferred) shared data, etc.

Although the present disclosure is described based on the current V2X technology for better understanding thereof, the disclosure is not limited to the V2X technology. In other words, the disclosure is applicable to other communication technologies including a new vehicle-to-vehicle communication technology such as new RAT (NR) V2X. In addition, although a UE performing sensing operation is taken herein as an example of a device for selecting a resource for data transmission, this is merely exemplary. That is, the present disclosure is applicable to all communication devices including a vehicle, a UE mounted in a vehicle, an eNB, a road side unit (RSU), etc. which are configured to recognize a restricted resource as an available resource in selecting time/frequency resources if the predetermined condition is satisfied.

If a UE performs resource selection based on sensing without assistance from an eNB like a V2X Mode-4 UE, the UE first excludes reserved resources based on a detected SA regardless of additional information such as the location, speed, accelerated speed, beam direction, etc. of a vehicle. Thereafter, the UE determines a time/frequency resource having PSSCH-RSRP (physical sidelink shared channel-reference signal received power) less than or equal to a prescribed threshold as its resource. In this case, the SA detected on the road may be received from every vehicle within the valid sensing range of the UE performing the sensing. Accordingly, there is a problem that the UE restricts all reserved resources based on the received SA without consideration of information on itself or other vehicles.

Figure 9:
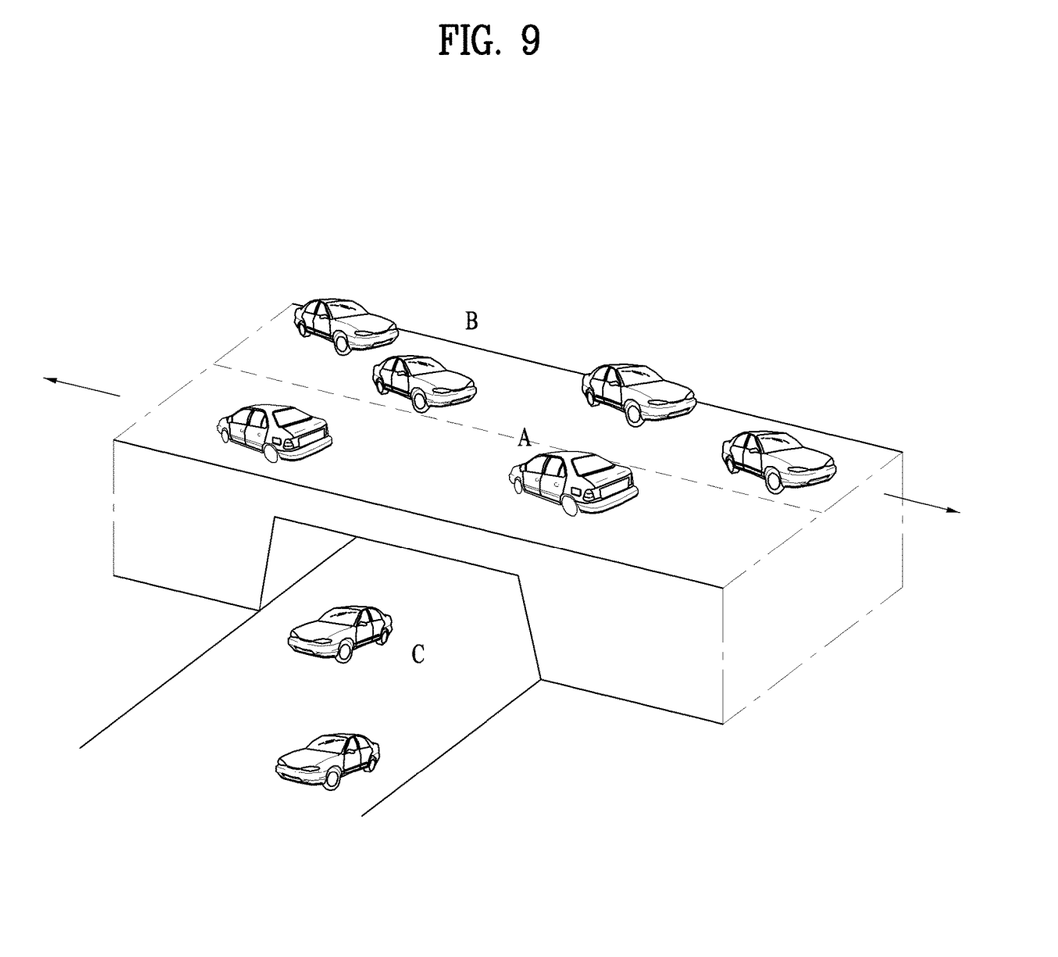
FIG. 9 is a diagram illustrating a case in which an existing vehicle-to-everything (V2X) Mode-4 UE restricts resources.

FIG. 9 is a diagram illustrating a case in which an existing V2X Mode-4 UE restricts transmission resources.

Referring to FIG. 9, the current resource restriction may restrict vehicles in A such that they cannot use resources occupied by vehicles in the opposite lane (B) or vehicles in another road (C) at the intersection when selecting their time/frequency resources.

However, since the moving direction of the vehicles in B or C is opposite or orthogonal to that of the vehicles in A, the vehicles may be far away from A after a predetermined time depending on their speeds, accelerated speeds, etc. For example, assuming that A and B are a highway, two vehicles in A and B move at the speed of 100 km/h, and a distance therebetween is 0 m, the distance may increase to about 55 m after one second. Assuming that A and B are a normal road and the two vehicles in A and B move at the speed of 60 km/h, the distance may increase to about 33 m after one second.

In addition, when different vehicles moving in opposite directions use opposite beam directions, the value of PSSCH-RSRP may be lower compared to when vehicles moving in the same direction use the same beam direction.

Additionally, if a UE has information about when a vehicle in the same lane reselects a resource/resource pool, the UE may recognize a corresponding resource as an available resource at a change time for more efficient use of resources. To this end, among resources obtained from sensing, resources reserved by vehicles in the opposite lane or another road need to be recognized as available resources after lapse of a predetermined time. In this case, the predetermined time should be calculated based on speeds, accelerated speeds, beam directions, resource change times, etc.

Meanwhile, as a V2X application where service reliability or continuity is mandatory such as an autonomous driving service is highlighted, a V2X communication entity should be able to not only share currently measured information of a UE(s) but also expect quality of service (QoS) and provide the QoS to another vehicle/eNB/RSU/pedestrian in order to guarantee service requirements.

In this case, the QoS may correspond to information about a data rate/latency/reliability/quality, and it may be expressed using parameters such as guaranteed bit rate (GBR), packet delay budget (PDB), and/or packet error rate (PER). If QoS degradation is expected within a specific time from the occurrence of an event, adjusting the autonomous driving level or switching to manual driving may be determined before the occurrence of the event.

To expect the QoS, the following information may be required: (1) information on the driving intention and path of another V2X communication entity (e.g., UE/eNB/RSU); (2) network states; and/or (3) physical channel states (e.g., fading effect, blocker appearance, etc.).

The main reasons why the above-described method is applied to the QoS expectation is that (1) information on a vehicle close to itself (or information on a vehicle that may affect its QoS during a specific valid time) is required in the QoS expectation and that (2) in the case of a UE that requires the QoS expectation, the UE needs to transmit a message that provides information necessary for the QoS expectation or delivers QoS expectation results using a resource capable of guaranteeing a higher priority and a better channel state (e.g., fading, CBR, etc.) compared to when the conventional resource allocation method is applied. The condition that a message is related to the QoS expectation should also be considered as the predetermined condition for recognizing a restricted resource as an available resource.

Hereinafter, a method of performing resource selection according to an embodiment of the present disclosure will be described.

If a predetermined condition is satisfied, a UE may include a resource occupied by another UE in a selectable subset or exclude the corresponding resource from a restricted subset using at least one pieces of measurement information of the UE or the other UE (location, location after a certain amount of time, speed, accelerated speed, beam direction, occupied resources, etc.) which is grasped through at least one means (sensing, sensor data, (transferred) shared data, etc.).

Among the at least one means for grasping the resource occupied by the other UE, the sensing data means all data that can be obtained from data detected during the sensing process. For example, a UE may know the resource reserved for another vehicle from an SA included in data as defined in LTE-V2X and also know the speed, road, direction, location of a corresponding UE from a safety message. However, the sensing data may mean not only information that can be obtained from data according to the current LTE-V2X but also all information on UEs that can be obtained from data detected during sensing in all communication technologies including new V2X communication regardless of formats. In addition, the sensor data may mean all information detected by sensors in the vehicle or devices mounted thereon.

For example, the sensor data may mean all information including processed data that can be obtained by the vehicle directly or indirectly regardless of cellular communication such as radar, Lidar (laser radar), GPS, navigator, black box, camera, and application data. The shared data may mean all information about other vehicles directly or indirectly transferred regardless of formats or sharing entities (e.g., UE, RSU, eNB, etc.).

The at least one piece of measurement information obtained through the at least one means for grasping the resource occupied by the other UE may correspond to processed data. For example, information on the location and moving direction of a UE may correspond to not only direct data obtained by the sensor, GPS, etc. of the UE but also processed data obtained from a predefined indicator or processed data estimated by a neighboring cell based on the ID of an RSU. In addition, if the UE is in the RRC connected state, the UE may obtain the moving direction information when performing handover between cells. If the UE is in the RRC idle state, the UE may grasp the moving direction information by tracking a change in the cell ID when cell reselection is performed. However, the above examples are merely examples of various methods of obtaining measurement information to be used for resource selection, and the present disclosure is not limited to methods of obtaining measurement information.

In the following, resource selection methods according to the present disclosure will be described.

(1) As a first embodiment, the UE recognizes the reserved resources of other vehicles, which are regarded as restricted resources, as resources that can be used immediately or after a predetermined time, using the at least one piece of measurement information of the UE or the other UE grasped through the at least one means. For example, when UE X of a vehicle in A performs resource selection at a time t, if it is expected that the energy/received power/quality of a received signal (e.g., PSSCH-RSRP) observed on a corresponding resource at a specific time, i.e., after a time t+n is lower than a threshold, UE X recognizes the reserved resources of UE Y of a vehicle in A, B, or C as resources available after the time t+n by considering at least one piece of information (location, moving direction, speed, accelerated speed, beam direction, etc.) on UE X or UE Y.

In this case, resources except the restricted resources are preferentially selected during the resource selection. If the amount of resources is insufficient, UE X may use the resources of UE Y. For example, if the amount of available resources in a resource pool for UE X is insufficient, UE X may use resources in a resource pool for UE Y. As another example, in the case of resource selection operation of a Mode-4 UE, if the threshold of PSSCH-RSRP is more than or equal to a predetermined value, the resources of UE Y may be used.

Alternatively, when considering the at least one piece of information (location, moving direction, speed, accelerated speed, beam direction, etc.) on UE X or UE Y of the vehicle in A, B, or C, UE X may preferentially consider specific information, a combination of pieces of specific information, or a parameter value based on the specific information (hereinafter these are referred to as pieces of specific information). The priorities of the pieces of specific information may not be defined. Alternatively the priorities may be fixed or flexibly changed. Further, the priorities may be predefined, determined by a signal transmitted from the network, or determined autonomously by a UE. Regarding the specific time t+n, n may have a single value or multiple values.

For example, when excluding resources from the restricted resources, UE X may exclude the reserved resources of A by prioritizing the direction among the pieces of specific information and then exclude resources corresponding to speeds less than or equal to a predetermined speed among the reserved resources of B or C by considering the current speed. Then, UE X may recognize the resources as resources available at the time t+0 (where n=0). Thereafter, UE X may recognize the remaining reserved resources as resources available at the time t+n (where n>=0) by considering the next priority information. As another example, UE X may selectively consider specific information to determine available resources, for instance, exclude the reserved resources of a UE moving in the same direction or the reserved resources of a UE moving at the same speed by prioritizing location-based information among the pieces of specific information.

Alternatively, UE X may use measurement information obtained by performing additional sensing before or after the specific time t+n. For example, if additional sensing results indicate that that the PSSCH-RSRP of the reserved resources of UE Y, which is measured before or after the time t+n, is lower than a threshold, UE X recognizes the reserved resources of UE Y as immediately available resources. As another example, if the additional sensing results indicate that a difference between the above-described PSSCH-RSRP of the reserved resources of UE Y measured before or after the time t+n and an expected value thereof is less than or equal to a predetermined level, UE X recognizes the resources of UE Y as resources available after the time t+n.

(2) As a second embodiment, the UE recognizes the reserved resources of other vehicles, which are regarded as restricted resources, as resources that can be used immediately or after a predetermined time, using resource/resource pool reselection time information among the at least one piece of measurement information of the UE or the other UE grasped through the at least one means. For example, when UE X performs resource selection, UE X recognizes the resources of UE Y of another vehicle as available resources after a resource/resource pool reselection time t+N.

In this case, resources except the restricted resources are preferentially selected during the resource selection. If the amount of resources is insufficient, UE X may use the resources of UE Y. For example, if the amount of available resources in a resource pool for UE X is insufficient, UE X may use resources in a resource pool for UE Y. As another example, in the case of resource selection operation of a Mode-4 UE, if the threshold of PSSCH-RSRP is more than or equal to a predetermined value, the resources of UE Y may be used.

Alternatively, UE X may use measurement information obtained by performing additional sensing before or after the specific time t+N. For example, if additional sensing results indicate that that the PSSCH-RSRP of the reserved resources of UE Y, which is measured before or after the time t+N, is lower than a threshold, UE X recognizes the reserved resources of UE Y as immediately available resources.

It is obvious that the above-described first and second methods can be combined. In addition, even if a specific condition is satisfied, a corresponding reserved resource or resource pool may be configured not to be occupied. Alternatively, it may be separately indicated.

However, although the above-described methods are functionally applied to UEs, all the UEs do not necessarily need to perform the corresponding operation. In other words, the corresponding operation may be performed by some or all UEs. The time when the corresponding operation is triggered, ON/OFF timing, or parameter values required for the corresponding operation may be autonomously determined/performed by a UE. Alternatively, they may be provided by another UE or a network entity such as an eNB, an RSU, etc. Further, a UE may transmit results obtained by applying the methods according to the present disclosure or information processed based on the results to other UEs, and a UE that receives the information may perform the operation according to the present disclosure or part thereof based on the received information.

For example, assuming that UE X, UE Y, and UE Z are in A, UE X may perform the processes of the above-described methods and transmit information on a resource or resource pool that should be excluded or not from a restricted subset, direct or indirect information about a corresponding time, or parameters required for the above-described methods to other UEs, UEs Y and Z. Then, UEs Y and Z may ignore the corresponding information, perform the operation according to the present disclosure regardless of the corresponding information, or perform the processes of the above-described methods by considering the corresponding information as shared data. In addition, UEs Y and Z may operate by selectively applying some parameters in the processes of the above-described methods or perform an operation such as excluding a resource or a resource pool where the restriction needs to be released from the restricted subset based on the corresponding information.

Figure 10:
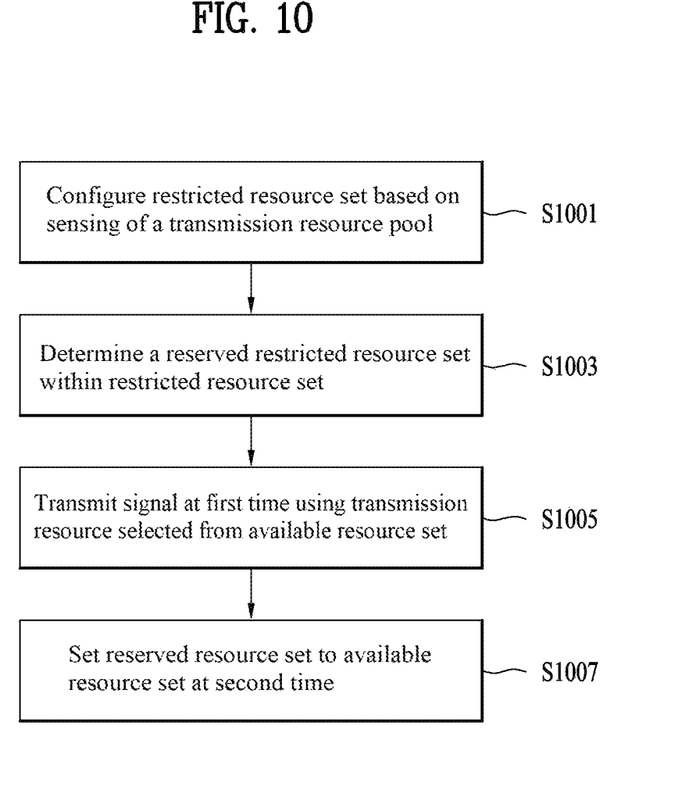
FIG. 10 is a flowchart illustrating an example in which a vehicle UE transmits a signal using D2D communication according to an embodiment of the present disclosure.

FIG. 10 is a flowchart illustrating an example in which a vehicle UE transmits a signal using D2D communication according to an embodiment of the present disclosure.

Referring to FIG. 10, the vehicle UE configures a restricted resource set based on sensing of a transmission resource pool in step 1001. Specifically, at least one resource with a sensing result more than or equal to a threshold in the transmitting resource pool is configured as the restricted resource set.

Next, the vehicle UE determines a reserved resource set within the restricted resource set in step 1003. In particular, at least one resource with a sensing result expected to be less than or equal to the threshold at a second time in the restricted resource set is determined as the reserved resource set. More specifically, whether the sensing result is expected to be less than or equal to the threshold at the second time may be determined based on at least one of a moving direction of another vehicle UE, a moving speed of the other vehicle UE, or a transmission beam direction of the other vehicle UE.

The vehicle UE transmits the signal at a first time using a transmission resource selected from an available resource set except the restricted resource set in the transmission resource pool in step S1005. Thereafter, the vehicle UE sets the reserved resource set to the available resource set at the second time after the first time in step 1007.

Additionally, when there are insufficient resources in the available resource set for transmitting the signal at the first time, the vehicle UE may select the transmission resource from the reserved resource set.

Figure 11:
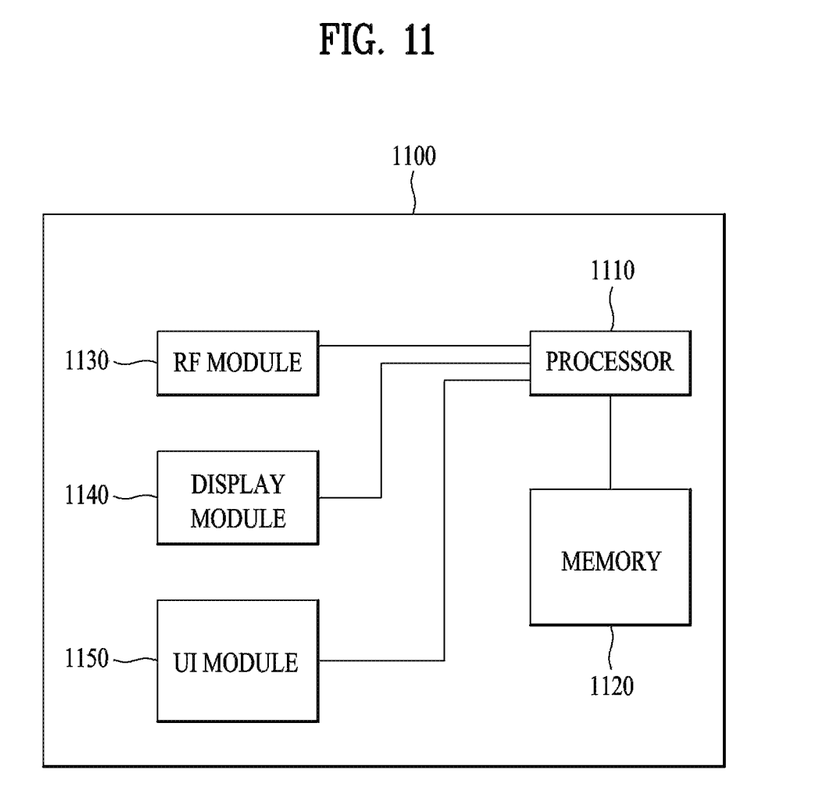
FIG. 11 is a diagram showing configurations of a base station and a user equipment applicable to an embodiment of the present disclosure.

FIG. 11 is a block diagram of a communication apparatus according to an embodiment of the present disclosure.

Referring to FIG. 11, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present disclosure described before with reference to the drawings. Specifically, for detailed operations of the processor 1110, the descriptions of FIGS. 1 to 10 may be referred to.

The memory 1120 is connected to the processor 1110 and stores an Operating System (OS), applications, program codes, data, etc. The RF module 1130, which is connected to the processor 1110, up-converts a baseband signal to an RF signal or down-converts an RF signal to a baseband signal. For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present disclosure may be achieved by various means, for example, hardware, firmware, software, or a combination thereof. In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the method for allocating a transmission resource for D2D communication in a wireless communication system and apparatus therefor are described based on the 3GPP LTE system, the method and apparatus are applicable to various wireless communication systems as well as the 3GPP LTE system.

The invention claimed is:

1. A method of transmitting, by a vehicle user equipment (UE), a signal using device-to-device (D2D) communication in a wireless communication system, the method comprising:
    configuring, as a restricted resource set, at least one first resource having a first sensing result greater than or equal to a threshold in a transmission resource pool;
    configuring, as a reserved resource set, at least one second resource having a second sensing result which is expected to be less than or equal to the threshold at a second time within the restricted resource set; and
    transmitting the signal at a first time using a transmission resource selected from an available resource set except the restricted resource set in the transmission resource pool,
    wherein the reserved resource set is set to the available resource set at the second time,
    wherein whether the second sensing result is expected to be less than or equal to the threshold at the second time is determined based on at least one of a moving direction of a counterpart vehicle UE, a moving speed of the counterpart vehicle UE, or a transmission beam direction of the counterpart vehicle UE.

2. A user equipment (UE) configured to transmit a signal using device-to-device (D2D) communication in a wireless communication system, the UE comprising:
    a wireless communication unit;
    a processor connected to the wireless communication unit; and
    a computer-readable memory storing instructions that, based on being executed by wherein the processor, perform operations comprising:
    configuring, as a restricted resource set, at least one first resource having a first sensing result greater than or equal to a threshold in a transmission resource pool,
    configuring, as a reserved resource set, at least one second resource having a second sensing result which is expected to be less than or equal to the threshold at a second time within the restricted resource set, and
    transmitting the signal at a first time using a transmission resource selected from an available resource set except the restricted resource set in the transmission resource pool,
    wherein the reserved resource set is set to the available resource set at the second time,
    wherein whether the second sensing result is expected to be less than or equal to the threshold at the second time is determined based on at least one of a moving direction of a counterpart vehicle UE, a moving speed of the counterpart vehicle UE, or a transmission beam direction of the counterpart vehicle UE.

* * * * *